United States Patent

[11] 3,532,180

| [72] | Inventors | Allen G. Ford<br>Rockville;<br>Robert A. Wilson, College Park, Maryland |
|---|---|---|
| [21] | Appl. No. | 730,138 |
| [22] | Filed | May 17, 1968 |
| [45] | Patented | Oct. 6, 1970 |
| [73] | Assignee | the United States of America, as represented by the Secretary of the Navy |

[54] SEMI-FLEXIBLE SEAL FOR CAPTURED AIR BUBBLE VEHICLE
7 Claims, 3 Drawing Figs.

[52] U.S. Cl................................................. 180/126
[51] Int. Cl................................................. B60v 1/04
[50] Field of Search.................................... 180/126, 120, 127

[56] References Cited
UNITED STATES PATENTS

| 3,027,860 | 4/1962 | Priest | 180/126X |
|---|---|---|---|
| 3,191,705 | 6/1965 | Jones et al. | 180/126 |

*Primary Examiner*—Harry A. Levy
*Attorneys*—L.A. Miller, Q.E. Hodges and A. Sopp ABSTRACT: A captured air bubble vehicle is provided with fluid-biased fore and aft semi-flexible seals, each comprised of an upper, relatively rigid panel movable about a transverse axis and a lower relatively flexible panel attached to the upper panel for low drag local compliance with minor surface waves. The local compliance of the lower panel improves roll, heave, yaw and pitch stability of the craft. The co-action of the panels reduces chance of sudden venting of the craft supporting bubble.

INVENTORS
ALLEN G. FORD
ROBERT A. WILSON

ATTORNEYS

Patented Oct. 6, 1970

3,532,180

INVENTORS
ALLEN G. FORD
ROBERT A. WILSON

BY

ATTORNEYS

SEMI-FLEXIBLE SEAL FOR CAPTURED AIR BUBBLE VEHICLE

The invention described herein may be manufactured and used by or for the Government of the United States of America for governmental purposes without the payment of any royalties thereon or therefor.

BACKGROUND AND SUMMARY

A central problem in development of captured air bubble (CAB) vehicles and surface effect vehicles in general has been stability. Surface effect vehicles as a class tend to be unstable in turns and in pitch. A turn consists of roll, heave and yaw components. When a CAB vehicle is in a turn, the vehicle supporting bubble is more likely to be suddenly vented because the roll angle of the craft causes separation between the water and the high side of fore and aft seals. The present invention overcomes bubble venting by means of transversely compliant fore and aft seals.

Another problem in CAB vehicles is transmission of high frequency vibrations at high speeds caused by drag and inertia of the fore and aft seals reacting to surface waves. The present invention by means of novel, resiliently biased semi-flexible fore and aft seals, reduces vibration transmission to the vehicle.

The objects of the present invention in addition to those implicit above, are to provide:

A surface effect vehicle of light weight bottom configuration amenable to surface waves at high speeds and of low drag characteristics;

An improved surface effect vehicle of the CAB type having turning stability without loss of the bubble;

An improved CAB vehicle having low vibration transmission characteristics at high speed and high turning stability without requiring complicated and expensive hull modification.

BRIEF DESCRIPTION OF THE DRAWINGS

Other objects as well as features and advantages of the present invention will become apparent from the following description and accompanying drawings in which.

DETAILED DESCRIPTION

Figure 1:
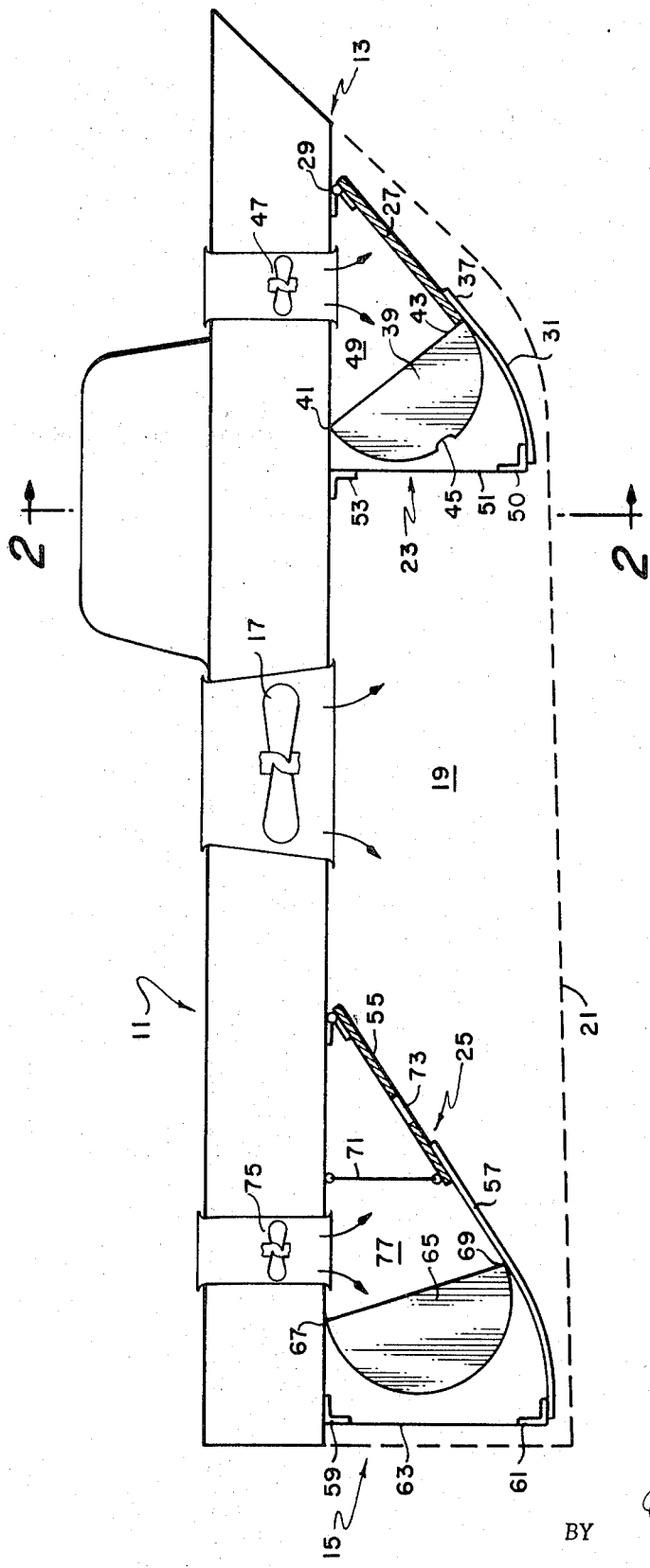
FIG. 1 is a modified view in longitudinal cross section of a CAB vehicle incorporating the arrangement of the present invention.

Referring to FIG. 1, a CAB vehicle 11 having a bow 13 and stern 15 has a fan 17 for sustaining a vehicle-supporting bubble in the space 19 defined by sidewalls 21 and fore and aft seals 23, 25, respectively.

Figure 2:
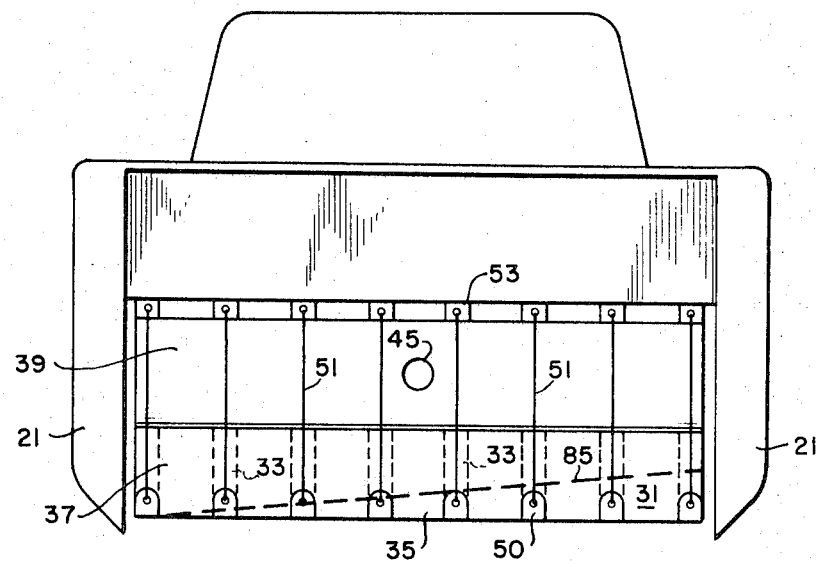
FIG. 2 is a view looking forward of a transverse portion of the craft from the cut 2—2 in FIG. 1.

As seen in FIGS. 1 and 2 taken together, the foreward seal 23 is composed of an upper panel 27 rotatably mounted as by a transverse hinge 29. The panel 27 is of relatively stiff construction, although it may be capable of slight bending. A lower panel 31 is made of any suitable material relatively flexible in relation to upper panel 27. For example, the upper panel may be made of wood, fiberglass, or may be a product of B.M. Goodrich, Inc. known as "Airmat". The lower panel may also be an "Airmat" of thinner and more flexible characteristics than the "Airmat" used in the upper panel.

Alternatively, the lower panel may be composed of spaced apart spring steel strips 33 (FIG. 2) sewn or bonded watertightly within a fabric or rubber material 35 to form a flexible, locally compliant panel extending athwart the vehicle 11 and movable in relation to the vehicle widewalls.

The lower panel 31 is attached in any suitable manner as by bolts, bonding, etc., to the upper panel 27 so that the upper end 37 of the lower panel extends over and parallel to the lower end of the upper panel.

A flexible bag 39 in the form of a hollow semi-cylinder having its height extending thwartships is attached at its upper straight edge 41 to the underside of the vehicle deck in any suitable manner. A rubber, wood or steel reinforcing strip may be used for the attachment.

The lower edge 43 of the bag 39 is attached to the upper surface of the lower panel 31 at or very close to the point of panel overlap so that the lower surface portion of the bag 31 is essentially parallel to the lower panel at the point of tangency.

The aft end of the bag 39 has one or more apertures 45 therein. A fan 47 is located on the vehicle 11 so that it pumps air into the chamber 49 formed by the bag 39 and upper panel 27. Because of the tangential orientation of the lower surface of the bag to the panels, the static air pressure in chamber 49 will not cause the bag to distend so as to lift the panels.

The aft edge of the lower panel is provided with a plurality of brackets 49 mounted on the upper surface thereof. A plurality of transversely spaced stops such as cables, wires or wire ropes 51 attaches the lower brackets 49 to corresponding upper brackets 53 located on the vehicle underside so that the lower panel is flexibly bent into the illustrated convex downward shape.

The aft seal 25 is arranged in essentially the same manner as forward seal 23 and thus has a rotatable upper panel 55, a relatively flexible, convex downward lower panel 57 overlappingly attached thereto, an aft limit stop composed of upper and lower brackets 59, 61 connected by cables, wires, etc., 63, and a semi-cylindrical bag 65 attached at its upper edge 67 to the deck underside.

The arrangement of the aft seal 25 differs from forward seal 23 in that: The lower edge 69 of bag 65 is tangentially attached to the lower panel 57 at a point aft of the junction of the panels; a limit stop 71 is provided to limit the lowermost position of upper panel 55; the panel 55 has an aperture 73 therein, and a fan 75 supplies air to the chamber 77 formed by the bag and both panels 55, 57.

Figure 3:
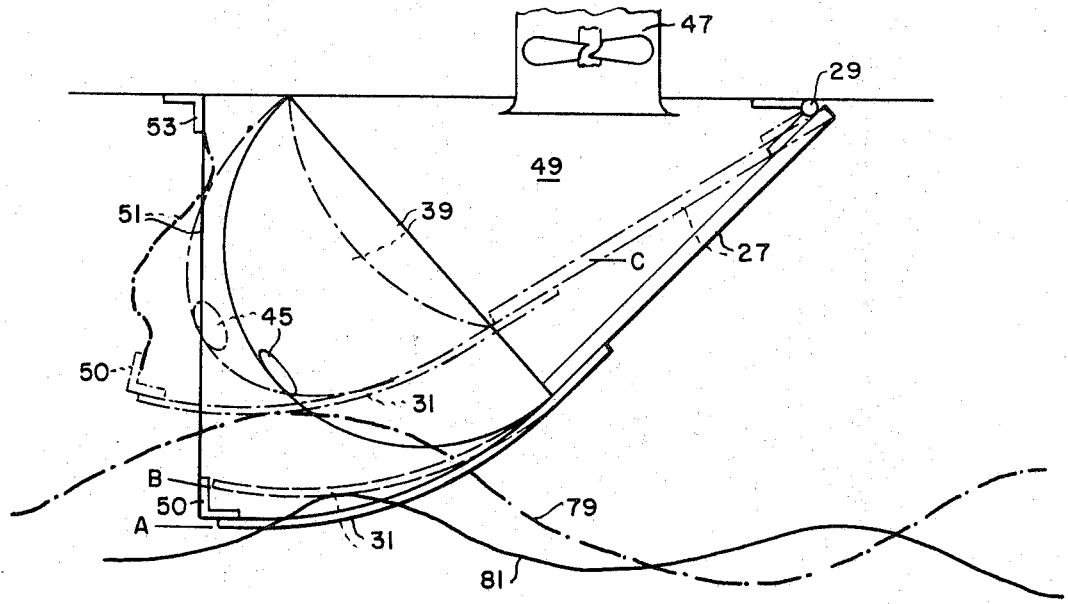
FIG. 3 is a side view of a vehicle end seal for demonstrating the action of the seal relative to surface waves.

In operation, the action of the seals as vehicle 11 speeds over water may be visualized in FIG. 3 illustrating large waves 79 and small waves 81. FIG. 3 depicts the forward seal 23 although the operation of the aft seal is similar.

The flexible panel 31 with its convex-downward shape flexes from, say, position A to B in response to passage of small waves 81, while maintaining a low trim angle, say, 2° or so, for minimum drag. Static air pressure provided by fan 47 biases the upper panel 27 to a downward position inhibiting its movement with panel 31 responsive to small waves.

With occurrence of larger waves 79 the upper panel may give way, as shown, to position C against the bias of static air pressure in chamber 49. Although the lower panel in position C is shown curved, it becomes straight, thus eliminating suction. The bag 39 is, of course, collapsible and also yields while maintaining the integrity of the chamber. Any sudden surges in air pressure in chamber 49 are relieved by venting via aperture 45 in bag 39 to the space 19, thus fortuitously reinforcing vehicle-supporting bubble pressure.

The aft seal 25 operates similarly to forward seal 23 except that air from pressure surges is vented from chamber 77 via aperture 73 in upper panel 55 to space 19. Further, although the lower edge 69 of bag 65 urges against lower panel 57 instead of upper panel 55, the flexible lower panel has sufficient aft extension as shown to flex with smaller waves. The stop 71 prevents undue strain on the bag 65.

Thus the fore and aft seals 23, 25 absorb relatively high frequency vibrations from small waves and with large waves provide, in addition to absorbing surface wave shock, pitch stability because of the resilient, static air pressure bias urging the seals toward downwardly extended positions.

Referring to FIG. 2, the operation of the seals in turns can be understood in that broken line 85 represents both the position of the bottom edge of the seal and the approximate level of the water surface during a turn. Because the seals are of articulated-like construction in the transverse dimension of the vehicle a higher water level on one side of the vehicle may be accommodated by larger local displacement of the seal panel portions thereat than on the other side. In other words, the thwartships construction of the panels enables their free movement in relation to the vehicle sidewalls. Provision of chamber-defining elements which are not rigid enables local compliance of the seals with differences in thwartships water level and thus acceptability of differential spanwise loading on the vehicle.

Consequently while in a turn the vehicle supporting bubble will remain substantially intact even though surface waves are present.

Obviously many modifications and variations of the present invention are possible in the light of the above teachings. It is therefore to be understood that within the scope of the appended claims the invention may be practiced otherwise than as specifically described.

We claim:

1. Improved end seal means for a water traversable CAB vehicle of the type having a hull and a supporting fluid bubble therefor, said hull having opposing depending sidewalls confining said bubble therebetween and forming, with said seal means, a plenum chamber, said improved end seal means comprising:
   body means defining a rigid panel dependingly attached to said hull and movably mounted for rotation about a thwartships vehicle axis;
   said body means having a flexible lower portion transversely of the vehicle and secured to the lower portion of said panel;
   essentially collapsible wall means approximately coextensive thwartships with said body means and attached at its lower end to a portion of said body means spaced from the ends of said body means and at its upper end to a portion of said hull and forming with said hull portion and said body means a variable volume chamber;
   venting means connecting said variable volume chamber with said plenum chamber for relieving pressure in said variable volume chamber and for reinforcing the vehicle-supporting bubble pressure in said plenum chamber; and
   means for supplying gaseous fluid to said variable volume chamber at a pressure sufficient to bias said body means to a position for contact with the water.

2. Improved end seal means according to claim 1 including:
   limit stop means attached at its upper end to said hull and at its lower end to said body means for defining the lowermost dependency of said body means.

3. Improved end seal means according to claim 1 wherein the flexible lower portion of said body means comprises a water repelling fabric watertightly enclosing a plurality of transversely spaced apart spring steel strips.

4. Improved end seal means according to claim 1 wherein said lower portion of said body means is composed of a pliable material having a plurality of rigid elements transversely spaced apart, said body means being thicker and more rigid at its upper portion than at its lower portion, whereby the lower portion is more flexible than the upper portion.

5. In a water traversable CAB vehicle of the type having a hull with depending opposing sidewalls laterally confining a vehicle supporting air bubble, improved end seal means comprising:
   forward and aft seals each comprising body means defining a rigid panel depending from said hull and attached thereto for rotational movement about a thwartships vehicle axis and a flexible portion thwartships the vehicle depending from and secured to said panel;
   essentially collapsible wall means approximately coextensive thwartships with each of said body means and attached at its lower end to a portion of said body means spaced from the ends of said body means and at its upper end to a portion of said hull and forming an expansible chamber with said hull portion and said body means; and
   means for supplying gaseous fluid to said chamber under pressure sufficient to bias said body means to a position for contact with the water.

6. Improved end seal means according to claim 5 including limit stop means connecting said hull and body means to limit the lowermost dependency of said body means.

7. Improved end seal means according to claim 6 wherein the essentially collapsible wall means in the forward seal has aperture means therein for venting the air within the chamber at the forward seal to the vehicle bubble; and
   wherein the body means of the aft seal has aperture means therein for venting the air within the chamber at the aft seal to the vehicle bubble.